(12) United States Patent
Jerabek et al.

(10) Patent No.: US 12,279,693 B2
(45) Date of Patent: Apr. 22, 2025

(54) CONNECTION DEVICE, STRUCTURAL SYSTEM AND SHELVING UNIT

(71) Applicant: VISPLAY GMBH, Weil am Rhein (DE)

(72) Inventors: Harald Jerabek, Neuenburg (DE); Marco Sander, Weil am Rhein (DE)

(73) Assignee: VISPLAY GMBH, Weil am Rhein (DE)

( * ) Notice: Subject to any disclaimer, the term of this patent is extended or adjusted under 35 U.S.C. 154(b) by 215 days.

(21) Appl. No.: 17/794,407

(22) PCT Filed: Jan. 25, 2021

(86) PCT No.: PCT/EP2021/051587
§ 371 (c)(1),
(2) Date: Jul. 21, 2022

(87) PCT Pub. No.: WO2021/148671
PCT Pub. Date: Jul. 29, 2021

(65) Prior Publication Data
US 2023/0065798 A1 Mar. 2, 2023

(30) Foreign Application Priority Data
Jan. 23, 2020 (CH) .................................. 00075/20

(51) Int. Cl.
*A47B 96/06* (2006.01)
*A47B 45/00* (2006.01)
(Continued)

(52) U.S. Cl.
CPC .......... *A47B 47/0025* (2013.01); *A47B 45/00* (2013.01); *A47B 57/20* (2013.01);
(Continued)

(58) Field of Classification Search
CPC ..... A47B 47/0025; A47B 45/00; A47B 57/20; A47B 57/404; A47B 57/545;
(Continued)

(56) References Cited

U.S. PATENT DOCUMENTS

| 6,631,874 B2 * | 10/2003 | Turpin ................. G02B 6/4459 248/235 |
| 9,456,692 B2 * | 10/2016 | Tibbe ................... A47B 96/061 |
| 2006/0209537 A1 | 9/2006 | Stelmasik et al. |

FOREIGN PATENT DOCUMENTS

| CH | 523039 A | 5/1972 |
| EP | 0262090 A1 | 3/1988 |

OTHER PUBLICATIONS

International Search Report and Written Opinion issued Mar. 18, 2021 in Intl. Appl. No. PCT/EP2021/051587.

* cited by examiner

*Primary Examiner* — Amy J. Sterling
(74) *Attorney, Agent, or Firm* — MEDLER FERRO WOODHOUSE & MILLS PLLC

(57) ABSTRACT

A connection device is disclosed for installing a shelf or a shelf frame on a vertical support to construct a shelving unit The connection device includes a hanger component and a bracket. The hanger component is equipped with a main body designed to be suspended from the vertical support such that an engagement portion engages behind a perforation of the vertical support and a support portion is arranged outside of the perforation. The bracket includes a housing portion designed to rest against the vertical support and a cavity shaped to receive the support portion of the main body of the hanger component. The bracket includes a clamping mechanism for clamping the housing portion of the bracket together with the vertical support when the cavity of the housing portion receives the support portion, (Continued)

and the main body of the hanger component is suspended from the perforation of the vertical support.

24 Claims, 6 Drawing Sheets

(51) Int. Cl.
| | |
|---|---|
| *A47B 47/00* | (2006.01) |
| *A47B 57/20* | (2006.01) |
| *A47B 57/40* | (2006.01) |
| *A47B 57/54* | (2006.01) |
| *A47F 11/10* | (2006.01) |
| *F16B 12/42* | (2006.01) |
| *F16B 12/44* | (2006.01) |

(52) U.S. Cl.
CPC .......... *A47B 57/404* (2013.01); *A47B 57/545* (2013.01); *A47F 11/10* (2013.01); *F16B 12/42* (2013.01); *A47B 2220/0077* (2013.01); *F16B 2012/443* (2013.01)

(58) Field of Classification Search
CPC . A47B 2220/0077; A47B 57/40; A47F 11/10; F16B 12/42; F16B 2012/443; F16B 12/44
See application file for complete search history.

CONNECTION DEVICE, STRUCTURAL SYSTEM AND SHELVING UNIT

TECHNICAL FIELD

The invention relates to a connection device and to a structural system for the modular construction of shelving units and to a shelving unit constructed from such a structural system.

BACKGROUND

In order to flexibly assemble furniture, systems are known in which furniture structures can be variably constructed from basic components. Variable furniture construction systems are widespread in particular in merchandise stores or in offices, where the furniture or the requirements for the furniture typically change from time to time.

Known variable furniture construction systems are often based on a three-dimensional supporting tube structure that can be constructed in various ways. For example, EP 0 262 090 A1 describes a furniture structure which has a plurality of tubes that can be connected via node elements. In this system, the tubes can be assembled in various ways by means of the node elements, and in particular frames or shelving units can be created in different shapes. The connected tubes can also be equipped with screens and shelves that are mounted between the tubes.

Simpler shelving units are also known in which lateral vertical supports are connected via one or more shelves. Hanger components are typically used to connect the vertical supports to the shelving units. In particular, the hanger components are each inserted into perforations in the vertical supports at a particular height, and then the shelves are placed on the hanger components protruding from the perforations.

Because the vertical supports in such shelving units are often only connected via the shelves placed thereon, they are typically relatively wobbly and are only able to carry insufficient loads. In particular, such shelving units are therefore usually unsuitable or not preferred for professional use in merchandise stores or at trade fairs.

In order to increase the stability of conventional shelving units, it is known to additionally connect the vertical supports to one another via transverse struts or via struts running diagonally. Such struts are typically bolted or similarly attached to the vertical supports. Although the struts can help achieve improved stability in the shelving unit, they also significantly increase the effort involved in constructing, reconfiguring and dismantling the shelving unit. Especially in modern retail stores or at trade fairs, among others, where nowadays there is an increasing need to frequently and extensively adapt the furniture, this additional effort is disadvantageous. In addition, the struts are often undesirable for aesthetic and safety reasons, as well as for practical reasons, such as accessibility to the shelves from all sides.

The supply of current to the tray shelves creates further difficulties in the case of the aforementioned known type of shelving units. Typically, the current is conducted on or in the vertical supports to the shelves and then from there to any consumers on the shelves. In the case of known shelving units, however, the power supply is typically inflexible and adapted to a specific design of the shelving unit. When reconfiguring the shelving unit, the supply of electrical power usually has to be relocated, which is expensive. At the same time, it is often difficult to ensure a clean or continuous power supply to the shelving unit.

Because, with the known shelving systems, constructing, reconfiguring and dismantling furniture is, as mentioned, expensive and can pose a safety risk if done improperly, nowadays it is typical to refrain from adapting the furniture to changing needs.

The object of the following invention is therefore to propose a system with which it is possible in a simple manner, without tools or exclusively with conventional simple tools, to flexibly set up or reconfigure shelving units or shelving structures that are sufficiently robust and provide enough safety that they are suitable, for example, for offices or retail stores. In particular, the system should make it possible to construct, reconfigure and dismantle shelving units or frames flexibly, efficiently and safely.

DESCRIPTION OF THE INVENTION

According to the invention, the object is achieved by a connection device, a structural system, and by shelving unit as disclosed herein and defined in the claims. Advantageous embodiment variants of the invention can be found in the dependent claims.

The essence of the invention is as follows: A connection device is provided for installing a shelf or a shelf frame on a vertical support equipped with at least one axially extending row of perforations in order to construct a shelving unit.

In this context, the term "shelving unit" refers to a piece of furniture or a furniture-like construction that has shelves connected via post-type or wall-type vertical supports. The shelving unit in this context can be used as structural furniture for the configuration and partitioning of rooms. Shelving units can be provided, for example, as free-standing furniture or for placement against walls. They can be implemented as open or at least partially closed structures.

The vertical support can have a tubular body. In this case, the tubular body can be shaped, for example, as a square tube. However, it is advantageously designed essentially as a round tube. Such round tubes are typically cylindrical with a hollow interior and a wall. The thickness of the wall or the wall thickness of the round tube can be adapted to the intended use. In particular, it can be designed in such a way that the round tube is sufficiently robust to carry or support shelving elements such as shelves attached to the round tube via the connection device or a plurality of such connection devices. In order to be able to carry sufficient loads and to have sufficient stability, the tubular body is advantageously made from a robust material. For example, the tubular body can be made of iron or steel. For aesthetic reasons, the tubular body can also be colored, for example powder-coated.

In a simple and expedient embodiment, the perforations can be provided as bores or openings in the tubular body. They can be shaped with a straight or horizontal lower edge so that the hanger component or hanger components can be suspended in a stable and secure manner. For example, the perforations can have a rectangular or square cross section.

The term "axial" in connection with the at least one row of perforations relates in particular to an extension along the vertical support or along a longitudinal axis of the typically elongated vertical support. The perforations are typically located at regular intervals from one another on a straight line that is parallel to or on the longitudinal axis of the vertical support.

The connection device according to the invention comprises a hanger component and a bracket. The hanger component comprises a main body which has an engagement portion and a support portion. The main body is designed to be suspended from one of the perforations of the vertical support, so that the engagement portion engages behind one of the perforations of the vertical support and the support portion is arranged outside of the aforementioned perforation of the perforations of the vertical supports.

The bracket comprises a housing portion which has a front face designed to rest against the vertical support and a cavity that is shaped so as to receive the support portion of the main body of the hanger component. The bracket is also equipped with a clamping mechanism.

The bracket can be integrated directly into a shelf or shelf frame. Or it can be configured as a component of a shelf or shelf frame. For example, the bracket can be configured as a corner or mounting corner of a shelf frame. Shelf frames can be provided in particular to be covered with a shelf on which items such as sales or presentation merchandise can then be placed.

The front face of the housing portion of the bracket may be configured to rest against the vertical support by being shaped to conform to the shape of the vertical support. For example, the front face can be shaped like a cylinder segment, concavely, if the vertical supports is in the form of a round tube. The front face allows the bracket to rest stably from the outside against the vertical supports or their walls. In this case, the front face can be dimensioned sufficiently large so that it can be pushed or pressed against the vertical support in order to clamp the bracket together with the vertical support.

The cavity of the housing portion of the bracket can be shaped in accordance with the support portion of the main body of the hanger component. In doing so, said cavity can at least partially surround the support portion in a flush manner. The support portion is advantageously received in the cavity quasi vertically from top to bottom. The bracket can rest on the hanger component or be carried by it. The cavity is therefore advantageously open at the bottom or accessible from below in the intended orientation.

The clamping mechanism is designed to clamp the housing portion of the bracket together with the vertical support when the cavity of the housing portion of the bracket receives the support portion of the main body of the hanger component and the main body of the hanger component is suspended from the aforementioned perforation of the perforations of the vertical support.

The housing portion of the bracket can be clamped together with the vertical support in different ways. In one efficient embodiment, this is accomplished by pushing the bracket against the vertical support. In particular, the front face of the housing portion of the bracket is pushed against the vertical support or the wall thereof. In this way, a surface contact can be created that stably connects the bracket and the vertical support to one another.

The clamping mechanism thus allows the bracket to be connected to the vertical support in a torsion-resistant and stable manner. If, for example, the shelf or the shelf frame is equipped with a plurality of, for example four, such brackets, a stable connection can be created to a corresponding plurality of, i.e. four, vertical supports, so that a robust structure as a piece of furniture or shelving unit can be achieved. Further struts or stabilizers in addition to the shelf or shelf frame or, advantageously, a plurality of such shelves or shelf frames are not required. In this way, a stable shelving unit designed to receive relatively large loads can be constructed very efficiently. This also allows for a relatively simple reconfiguration, expansion or dismantling of the shelving unit, so that shelving structures can be created efficiently and flexibly. In addition, such shelving units can be designed to be aesthetically pleasing.

The cavity of the housing portion of the bracket is preferably equipped with a first coupling structure, and the support portion of the main body of the hanger component is equipped with a second coupling structure, wherein the first coupling structure and the second coupling structure engage in one another when the cavity of the housing portion of the bracket receives the support portion of the main body of the hanger component and the main body of the hanger component is suspended from the aforementioned perforation of the perforations of the vertical support.

Such coupling structures allow a positive connection between the bracket and the hanger component, at least in certain directions. In particular, it can be achieved with such coupling structures that the bracket is blocked against movement of the bracket away from the vertical support by a positive fit. In this way, the bracket can be securely mounted on the vertical support via the hanger component.

The first coupling structure of the cavity of the housing portion of the bracket is preferably designed as a projection, and the second coupling structure of the support portion of the main body of the hanger component as a groove. Such a design as a groove and projection can allow an efficient realization of the coupling structures. The groove is advantageously formed on the support portion of the main body of the hanger component in such a way that it rests against a top side of the main body when the main body of the hanger component is suspended from the aforementioned perforation of the perforations of the vertical support. At the same time, the projection is advantageously designed in such a way that it extends into the cavity from above when the cavity of the housing portion of the bracket receives the support portion of the main body of the hanger component. It can thus be achieved in an efficient manner that the groove and the projection engage in one another when the bracket is placed from above onto the hanger component that is inserted in the vertical support. The projection can be configured as a bulge, a nose or something similar.

Preferably, the clamping mechanism of the bracket comprises a claw part having a first claw, the support portion of the main body of the hanger component is equipped with a second claw, and the first claw of the claw part of the clamping mechanism of the bracket and the second claw of the support portion of the main body of the hanger component engage in one another when the cavity of the housing portion of the bracket receives the support portion of the main body of the hanger component and the main body of the hanger component is suspended from the aforementioned perforation of the perforations of the vertical support.

The term "claw" in connection with the claw part and the hanger component refers to a structure that allows for an interlocking. This structure can be formed on the claw part or on the support portion. The claw can be nose-, finger- or tooth-like or designed in a similar way.

By means of the claw part, the clamping mechanism can efficiently produce a clamping effect between the bracket and the vertical support via hanger components. For example, the claw part can be pulled toward the bracket or away from the vertical support. Because the first claw and the second claw engage in one another, a pull can be generated on the hanger component, which pull in turn is transferred from the hanger component to the vertical support. In this way, the bracket can be pulled efficiently against the vertical support, so that the front face is pushed or pressed against the vertical support.

The claw part of the clamping mechanism of the bracket is preferably arranged in the housing portion of the bracket and can be moved relative to the housing portion of the bracket. In this way, it can be achieved that the claw part can be moved in a protected or unhindered manner in order to generate the aforementioned pull on the hanger component.

The clamping mechanism of the bracket preferably has an actuating element which is designed to move the claw part when it is actuated in such a way that the first claw of the claw part of the clamping mechanism of the bracket and the second claw of the support portion of the main body of the hanger component are pushed against one another. The movement can in particular be a linear movement. The bracket can be pulled or pushed efficiently via the actuating element against the hanger component and also be pulled or pushed thereby against the vertical support. In this way, the bracket and the vertical support can be securely clamped together.

The actuating element of the clamping mechanism of the bracket is preferably equipped with a thread, and the claw part of the clamping mechanism of the bracket is equipped with a mating thread corresponding to the thread, so that twisting the thread relative to the mating thread moves the claw part relative to the housing portion of the bracket. The actuating element can in particular be configured essentially helically. In such an embodiment, the thread is an external thread and the mating thread is a corresponding internal thread. A linear movement of the claw part can be generated via such threads running into one another via a rotary movement of the actuating element. In particular, such a screwing allows an easy application of a relatively high tensile force on the claw part.

The actuating element of the clamping mechanism of the bracket is preferably connected in a stationary manner to the housing portion of the bracket in a clamping movement direction. The clamping movement direction can be a straight line or lie on a straight line. The clamping movement direction is advantageously a direction toward the vertical support. For example, it can run radially to the vertical support if it is in the form of a round tube. The actuating element can be movable in a different direction of movement or in a different degree of freedom relative to the housing portion. For example, the actuating element can be turned or rotated relative to the housing portion, but not freely movable in the clamping movement direction or linearly. In this way, the actuating element can generate the movement of the claw part relative to the housing portion.

The bracket preferably comprises a cover that retains the claw part in the housing portion of the bracket. The cover can also hold other components that are arranged inside the housing portion, such as the contact and spring elements described below. Such a cover allows for a simple construction of the bracket. In particular, the bracket can be equipped with appropriate components as required and can be closed off by means of the cover.

The actuating element of the clamping mechanism of the bracket is preferably mounted on the cover of the bracket. In this way, an expedient, at least partially fixed connection between the actuating element and the housing portion can be produced in an efficient manner.

Preferably, the main body of the hanger component has a front side and a rear side, the front side of the main body of the hanger component is inside the vertical support when the main body of the hanger component is suspended from the aforementioned perforation of the perforations of the vertical support, the rear side of the main body of the hanger component faces away from the vertical support when the main body of the hanger component is suspended from the aforementioned perforation of the perforations of the vertical support, and the hanger component is designed to conduct current from the front side of the main body to the rear side of the main body.

With such a hanger component, current can be conducted from the inside of the vertical tube to the bracket in an efficient manner. The current can then be conducted from the bracket to a consumer such as a light fixture. In particular, such a hanger component in combination with the clamping mechanism allows current to be tapped off in the vertical support in a safe and reliable manner. For example, this can be achieved by a relatively accurate and fixed positioning of the bracket to the vertical support by means of the clamping mechanism.

Preferably, the hanger component comprises a contact element made from an electrically conductive material, the main body has an interior which is open to the front side via a front opening and to the rear side via a rear opening, and the contact element is arranged in the interior of the main body, so that the contact element protrudes through the front opening and is accessible through the rear opening. The main body is advantageously electrically insulated from the contact element. This can be accomplished by the main body itself being made of an electrically insulating material or by an insulation layer being arranged between the main body and the contact element. The contact element can be a contact pin. The contact pin can be made of a metal such as copper, for example. On the one hand, such a hanger component allows current to be tapped securely inside the vertical tube without contact with a person being possible. In addition, it also allows the current to be tapped off in a way that is protected from external influences, so that the current can be reliably dissipated.

The contact element of the hanger component is preferably arranged in the interior of the main body of the hanger component in such a way that it can be moved in a contacting movement direction relative to the main body of the hanger component. The contacting movement direction and the clamping movement direction can be identical. In particular, the main body and contact element can be designed in such a way that they can be moved relative to one another to a predefined extent.

The bracket preferably has a current tap which is arranged in the housing portion of the bracket and can be moved relative to the housing portion of the bracket. The current tap can be a separate component. For example, it may comprise a body of electrically insulating material to which one or more contacts are attached. The contacts can be connected to cables or similar conductors that conduct the current from the contacts to a point where it can be tapped by a consumer. The mobility of the current tap allows it to be pushed against the contact element, which allows efficient, secure contacting between the contact element and the current tap. In addition, the contact element can be pushed by means of the current tap for contacting inside the vertical tube.

The bracket preferably comprises a spring element that pushes the current tap of the bracket against the hanger component when the cavity of the housing portion of the bracket receives the support portion of the main body of the hanger component. The spring element can, for example, comprise a spring such as a coil spring.

The spring element of the bracket preferably pushes the current tap of the bracket through the rear opening of the main body against the contact element of the hanger component. As a result, the contact element can be moved and also pushed in the contacting movement direction. In this way, the contact element can be pushed against a conductor track inside the vertical support in an efficient manner. In this way, a particularly secure and reliable contact can be achieved.

The contact element of the hanger component preferably has a first inclined face, and the current tap of the bracket has a second inclined face designed counter to the first inclined face. The inclined faces are arranged so that they rest against one another when the cavity of the housing portion of the bracket receives the support portion of the main body of the hanger component. Such inclined faces allow the contact element and the current tap to be increasingly pushed while the main body is being received or installed in the cavity. As a result, reliable contact can be achieved between the contact element and the current tap and, at the same time, the contact element can be reliably pushed within the vertical support.

The housing portion of the bracket is preferably equipped with two mating portions for attaching a strut in each case, wherein the mating portions run at quasi-right angles to one another. Such a bracket can be used in an efficient manner as a corner of a shelf frame. The struts can be designed as square tubes, for example.

The housing portion of the bracket preferably comprises a projection which has the cavity and the front face and which extends approximately along a bisector of an external angle—for example, of almost 270° of the two mating portions. The bracket can thus be shaped in a quasi Y-shape. With such a projection, the cavity can be easily accessible, so that the bracket can be easily and efficiently attached to the hanger component. In this way, the struts of a shelf frame can also be offset inwardly. In a shelving unit that is made up of vertical supports and shelf frames constructed by means of the bracket, wherein the shelf frames are each attached to the vertical supports via a hanger component so that two adjacent vertical supports define a support level, the shelf frames can be situated outside of the support planes defined by the vertical supports connected thereto. Because the shelf frames are outside of the support planes, it can be achieved that entire frames can be attached to a plurality of vertical supports at the same time. This makes it easier and more efficient to construct and reconfigure a shelving unit or a piece of furniture. In addition, this allows a relatively stable construction. Furthermore, the versatility of the assembly options can be increased because the frames can be connected to other vertical supports and in a protruding manner between two vertical supports.

Preferably, the engagement portion of the hanger component has a hook region which is designed to be suspended from the aforementioned perforation of the perforations of the vertical support. In particular, the engagement portion can surround a lower edge of the perforation through the hook region, so that the hanger component engages behind the perforation and is securely attached to the vertical support.

The engagement portion of the hanger component preferably has a tongue region which extends counter to the hook region and which is designed to rest against a wall of the vertical support when the main body of the hanger component is suspended from the aforementioned perforation of the perforations of the vertical support. By means of the hook and tongue regions of the engagement portion, the hanger component can be stably and firmly mounted on the vertical support in a simple manner. At the same time, it can engage with the hook region around the lower edge of the aforementioned perforation of the perforations of the vertical support and be suspended therefrom and, with the tongue region, be supported against the rear side of the wall that forms the upper edge of the perforation.

In another aspect, the invention relates to a structural system for the modular construction of shelving units. The structural system comprises at least one vertical support and at least one connection device as described above. The vertical support is equipped with at least one axially extending row of perforations.

The structural system according to the invention and its preferred embodiments described below allow an efficient realization of the effects and advantages described above in connection with the connection device according to the invention and its preferred embodiments. In particular, the structural system can be used as a shelving or furniture kit from which shelving units can flexibly and easily be constructed, reconfigured and dismantled.

The structural system can in particular relate to a system for the modular construction of shelving units. It can be provided for the flexible construction, reconfiguration, expansion and dismantling of shelving units or similar furniture as required with components of different sizes and designs. The structures or shelving units or similar furniture constructed with the structural system can also be used for dividing or structuring a room. The structural system can also be referred to as a shelving kit.

Preferably, the at least one vertical support has a hollow tubular body and a current profile equipped with at least one conductor track, the tubular body is equipped with at least one row of perforations, and the current profile is arranged inside the tubular body, so that the at least one conductor track extends along the tubular body.

The conductor track can be any path, track, cable or similar structure made of an electrically conductive material. For example, the conductor track can be a relatively narrow strip of metal, such as copper.

The current profile serves in particular to carry or hold and align the conductor track(s). It can be equipped with a single conductor track. Advantageously, however, it comprises, for example, two conductor tracks that run parallel to one another. The two conductor tracks can have different polarities during operation.

The current profile can comprise an elongated carrier along which the conductor track runs. The carrier can be made of a sufficiently stable material that allows efficient production of the current profile. For example, it can be made of aluminum or a plastics material.

For safety reasons, the carrier can also be made of an electrically insulating material. Advantageously, however, the current profile may comprise an insulation base, wherein the insulation base is attached to the carrier extending along the carrier and the conductor track is attached to the insulation base extending along the insulation base so that it is insulated from the insulation base toward the carrier. With such a configuration of the current profile, its functions can be implemented in a preferred and specific manner. In particular, by selecting a suitable material, such as aluminum, the carrier can ensure sufficient stability and clean routing of the conductor track. At the same time, the insulation base can be selected without restriction, for example because of mechanical requirements, and adapted to an efficient insulation.

The structural system preferably comprises at least three further vertical supports, each having at least one axially extending row of perforations, at least seven further connection devices of the type described above and at least eight struts, wherein in each case four struts with four brackets of connection devices form a shelf frame by two struts being connected to one another via one of the brackets.

The shelf frames can be formed as quasi-rectangles, in that each of the brackets connects two struts to one another at right angles. All struts of a frame can be of the same length or two opposite struts can be shorter and two other opposite struts can be longer. Rectangular in the aforementioned sense can also be square. The struts can be beam-like or tubular. In particular, they can be made of metal or a solid plastics material as square tubes, for example.

The structural system may also comprise a set of shelves, each configured to be placed on top of one of the shelf frames when mounted on vertical supports. The term "placing" in this context refers to any loose, fixed, connected or other positioning of a shelf on one of the frames. Such shelves can be useful in many applications. In particular, they can be used to situate merchandise or other goods. The shelves can be made of different materials such as glass, wood, metal or a plastics material. The material can be selected based on aesthetic and/or functional perspectives.

The shelves are preferably each essentially rectangular. The term "rectangular" in the context of the shelves also comprises square shapes. Such rectangular shelves allow a simple and practical structure in many applications.

The vertical supports may comprise at least one vertical support having a plurality of axially extending rows of perforations. In particular, a plurality of rows of perforations can be formed on different sides of the vertical support. Frames can be attached to the vertical support on different sides, which allows the construction of relatively large or complex shelving units or similar furniture.

The vertical supports can each have a circular outer circumference in cross section. In particular, the cross section can be more or less at right angles to a longitudinal axis of the associated vertical support. The vertical supports can each comprise a tubular body in the form of a round tube. Such vertical supports which are in the form of a round tube can have a relatively high level of stability and appear relatively slim, which can be desirable for aesthetic reasons.

The shelves may each comprise four corners, each designed to partially surround one of the vertical supports. The corners of the shelves can each surround about a quarter of the circumference of the associated vertical supports. Such shelves make it possible to provide a relatively large support surface.

In yet another aspect, the invention relates to a shelving unit constructed from a structural system as described above. Such a shelving unit allows the effects and advantages described above in connection with the structural system according to the invention and its preferred embodiments to be implemented efficiently.

BRIEF DESCRIPTION OF THE DRAWINGS

Further advantageous embodiments of the invention result from the following description of embodiments of the invention with reference to the schematic drawings. In particular, the connection device according to the invention, the structural system according to the invention and the shelving unit according to the invention are described in more detail below with reference to the attached drawings on the basis of embodiments.

EMBODIMENT(S) OF THE INVENTION

Figure 1:
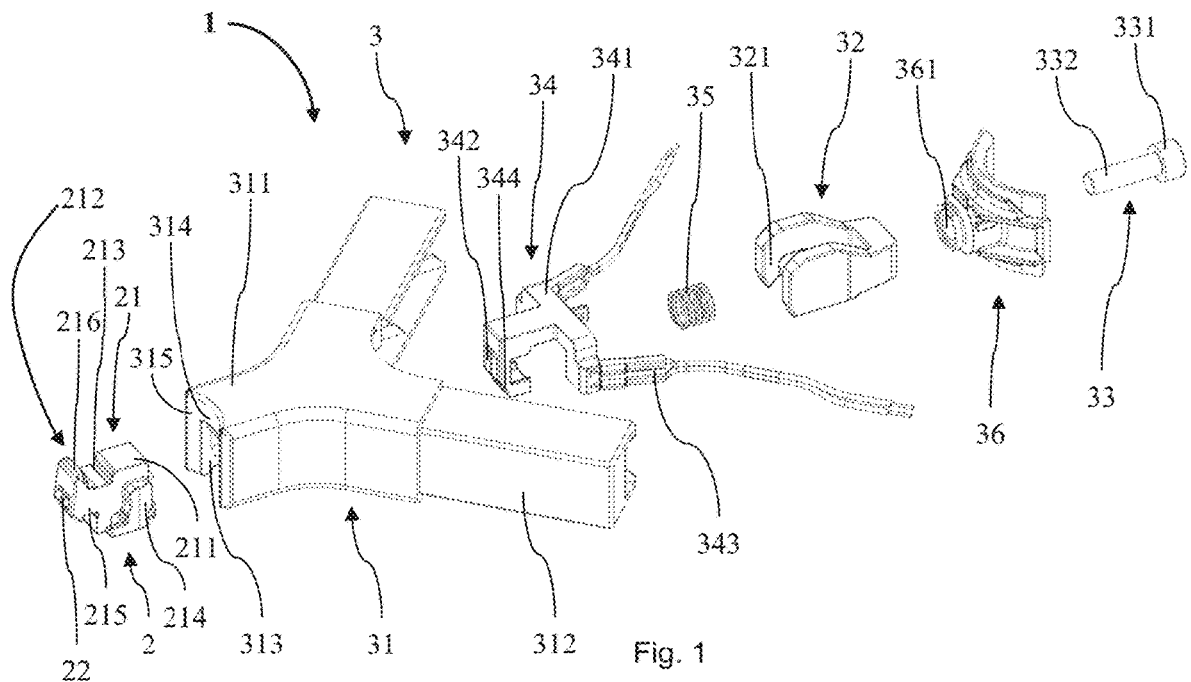
FIG. 1 is an exploded perspective view of an embodiment of a connection device according to the invention.

Certain terms are used in the following description for practical reasons and are not intended to be limiting. The words "right," "left," "below" and "above" indicate directions in the drawings to which reference is made. The terms "inward," "outward," "below," "above," "left," "right" or similar are used to describe the arrangement of designated parts relative to one another, the movement of designated parts relative to one another and the directions toward or away from the geometric center of the invention and designated parts thereof as shown in the drawings. This spatial relative information also comprises different positions and orientations from those shown in the drawings. For example, if a part shown in the drawings is reversed, elements or features that are described as "below" are then "above." The terminology comprises the words expressly mentioned above, derivatives thereof and words of similar meaning.

In order to avoid repetitions in the drawings and the associated description of the different aspects and embodiments, certain features are to be understood as common for different aspects and embodiments. The omission of an aspect in the description or a drawing does not suggest that this aspect is missing in the associated embodiment. Rather, such omission can serve for clarity and avoiding repetitions. In this context, the following specification applies to the entire further description: If reference signs are included in a drawing for the sake of clarity of the drawing, but are not mentioned in the directly associated description text, reference is made to the explanation thereof in the preceding descriptions of the drawings. If reference signs which are not contained in the associated drawing are also mentioned in the description text that belongs directly to a drawing, reference is made to the preceding and following drawings. Similar reference signs in two or more drawings represent similar or identical elements.

FIG. 1 shows an embodiment of a connection device 1 according to the invention with a hanger component 2 and a bracket 3. The hanger component 2 comprises a main body 21 and two contact pins 22 arranged therein as contact elements. The main body 21 has a front engagement portion 212 and a rear support portion 211. The engagement portion 212 has a lower hook region 215 and an upper tongue region 216. A groove 213 as a second coupling structure is embedded on an top side of the main body 21 between the engagement portion 212 and the support portion 211. In the region of the support portion 211, a second claw 214 projecting in relief is formed on the main body 21 on both side faces of the main body 21.

The bracket 3 is constructed from six components, namely—from left to right—a housing 31 as a housing portion, a current tap 34, a coil spring 35 as a spring element, a claw part 32 of a clamping mechanism, a cover 36 and an actuating screw 33 as an actuating element of the clamping mechanism. In a top view, the housing 31 is equipped in a quasi Y-shaped manner with two mating portions 312 situated at right angles to one another and a projection 311 extending along a bisector of an external angle of the two mating portions 312 of approximately 270°. The mating portions 312 are shaped so that a square tube can be attached.

An end of the projection 211 facing away from the mating portions 312 forms a curved front face 315. A cavity 313 is formed inside the projection 311. Adjacent to the front face 315, a projection 314 protrudes into the cavity 313 as the first coupling structure. The cavity 313 is open toward the bottom and toward the front face 314.

The current tap 34 comprises a body 341 that is quasi T-shaped in a top view and quasi hook-shaped in a side view. The body 341 is made of an electrically insulating material. The body 341 is equipped with two electrically conductive contacts 342 on its front side facing the housing 31. Starting from the front side, the body 341 has an inclined front underside 344 as a second inclined face. From a rear side of the body 341 facing away from the housing 31, two plugged-in connection cables 343 extend laterally from the body 341. The connection cables 343 are each electrically connected to the contacts 342.

In a top view, the claw part 32 is configured in a quasi U-shape with two wing regions connected via an intermediate region. A first claw 321 is formed in relief in each case on the insides of the wing regions. The intermediate region is provided with a bore (not visible in FIG. 1), which is equipped with an internal thread as a mating thread.

The cover 36 is formed in a quasi-arc shape to match a rear side of the housing 31 in a top view. In the middle, the cover 36 has a through hole that forms a screw head seat 361. The screw 33 has a cylindrical shank 332 and a head 331 adjoining it. The head 331 and the shank 332 are dimensioned such that the shank 332 fits through the through hole of the cover 36, but the head 331 does not.

Figure 2:
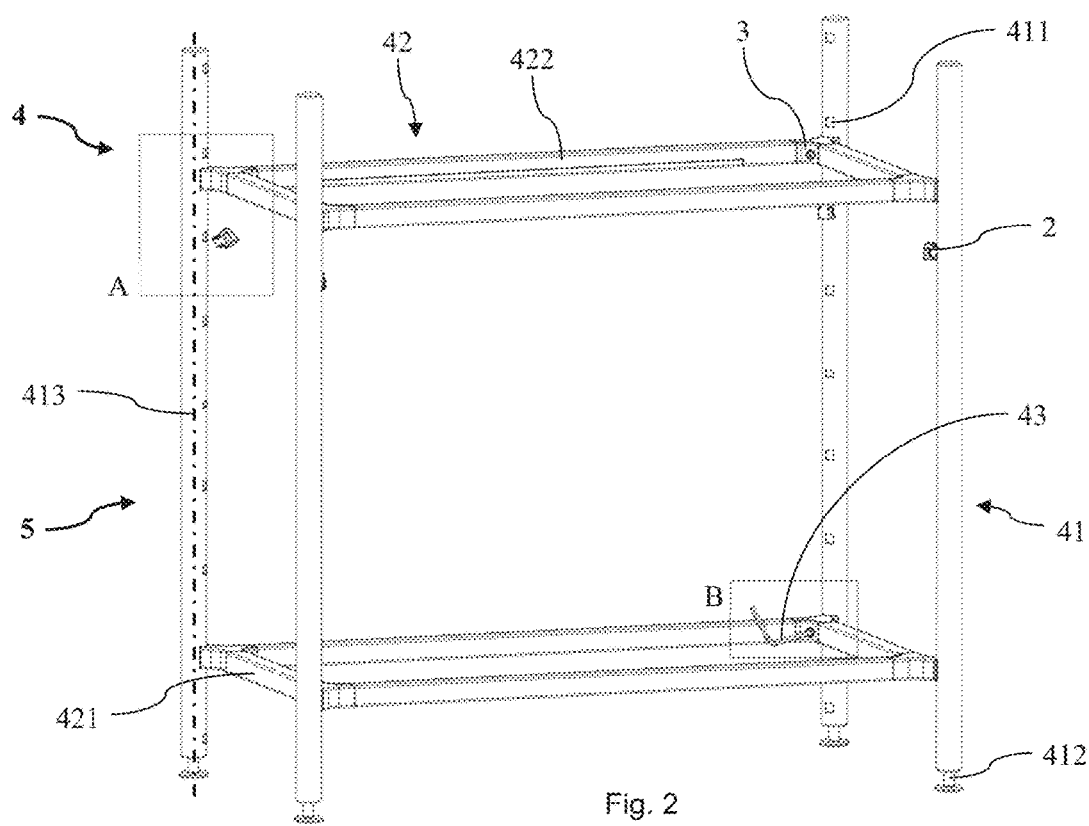
FIG. 2 is a perspective view of a first embodiment of a shelving unit according to the invention without shelves, which is constructed from an embodiment of a structural system according to the invention

FIG. 2 shows a first embodiment of a shelving unit 5 according to the invention as a simple embodiment of a shelving structure. The shelving unit 5 is constructed from components of an embodiment of a structural system 4 according to the invention. In particular, the shelving unit 5 is constructed from four vertical supports 41 of the same length and four shelf frames 42 of the structural system 4 of the same size.

The vertical supports 41 are each designed essentially in the form of a round tube, having a central longitudinal axis 413. They each comprise a straight row of perforations extending along the longitudinal axis 413, each row having nine regularly spaced individual perforations 411. The perforations 411 are each formed as an opening with a square cross section in a wall 414 of the associated vertical support 41. At the lower end, the vertical supports 41 are each equipped with a base 412 by means of which the vertical supports 41 can be placed on a floor.

The shelf frames 42 are each assembled from two longer longitudinal struts 422, two shorter transverse struts 421 and four brackets 3 used as mounting corners. In particular, a transverse strut 421 and a longitudinal strut 422 are connected to one another at right angles via one of the brackets 3. As a result, the shelf frame 4 forms an essentially rectangular shape. The longitudinal struts 422 and the transverse struts 421 are formed from square tubes. The brackets 3 of the shelf frames 42 are or will each be attached to one of the vertical supports 41, as described in more detail below, so that the shelf frame 42 and vertical supports 41 together form a stable free-standing frame as the shelving unit 5.

Figure 3:
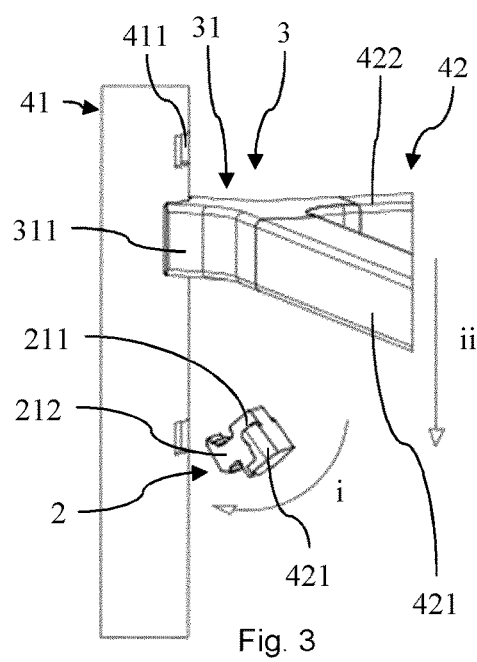
FIG. 3 is a perspective view of detail A of FIG. 2.
Figure 4:
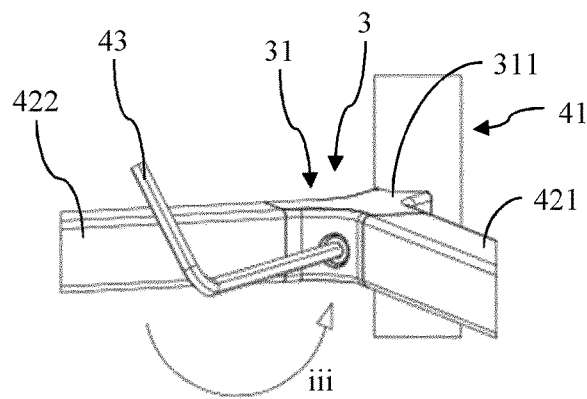
FIG. 4 is a perspective view of detail B of FIG. 2.

FIGS. 3 and 4 show an example of how one of the brackets 3 of the shelf frame 42 is mounted via one of the hanger components 2 of one of the vertical supports 41. In a first step (i), one of the hanger components 2 is inserted into one of the perforations 411. For this purpose, the engagement portion 212 of its main body 21 is inserted obliquely into the aforementioned perforation of the perforations of the vertical support 411, again aligned vertically, as soon as it is located within the vertical support 41, and is placed on the lower edge of the aforementioned perforation of the perforations 411. The hook region 215 engages around the lower edge of the aforementioned perforation of the perforations 411, so that the hanger component 2 is positively connected to the vertical support 41 such that it cannot move in the horizontal direction. At the same time, the tongue region 216 of the engagement portion 212 engages behind the upper edge of the aforementioned perforation of the perforations 411. As a result, the engagement portion 212 is supported, so that the support portion 211 of the main body 21 lying outside the vertical support 41 can be loaded.

In a second step (ii), the shelf frame 42 is placed on the hanger component 2 in such a way that the cavity 313 of the bracket 3 receives the support portion 211 of the main body 21.

In a third step (iii), the actuating screw 33 is tightened using an Allen wrench 43 as a screwdriver, as can be seen in FIG. 4. For this purpose, the head 331 of the actuating screw 33, which head is accessible via the through hole in the cover 36, is equipped with a hexagon socket.

Figure 5:
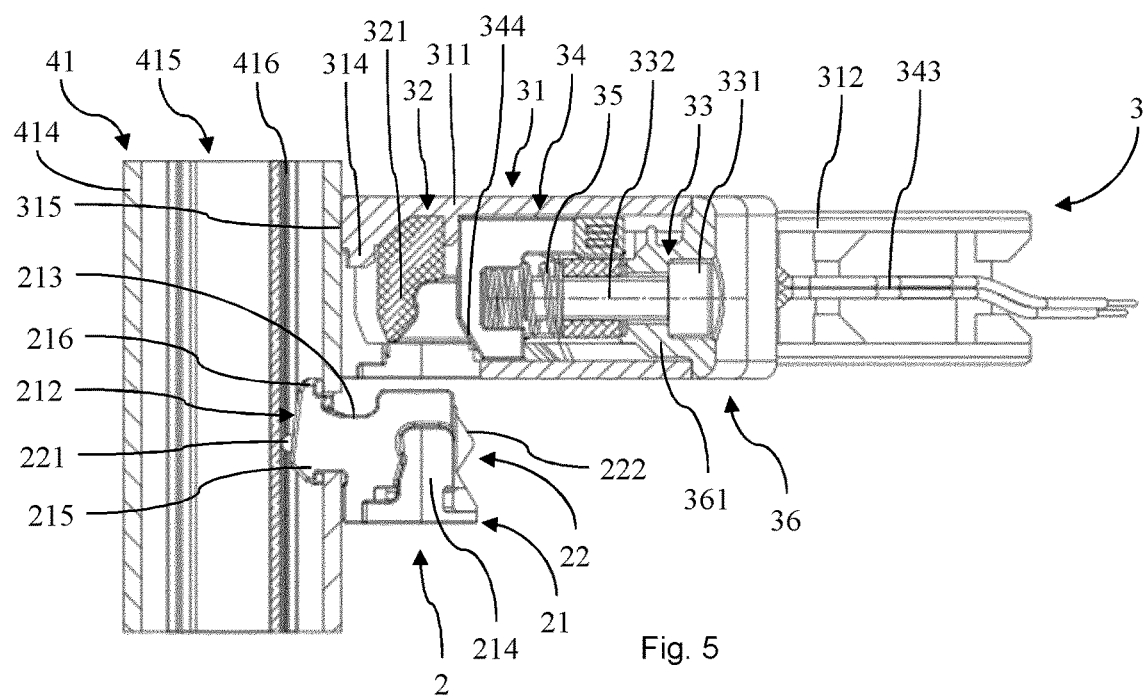
FIG. 5 is a cross-sectional view of the connection device from FIG. 1 when connecting a shelf frame of the structural system from FIG. 2 before a bracket receives a main body of a hanger component, wherein mechanical aspects of the connection are illustrated in particular.
Figure 6:
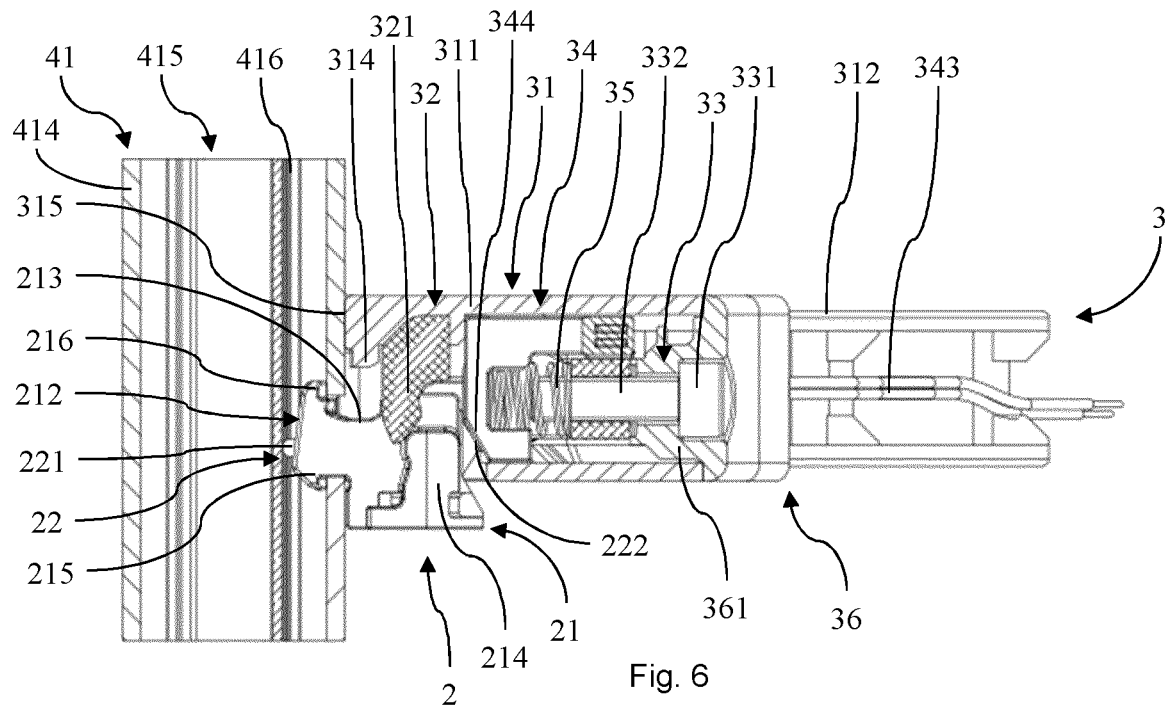
FIG. 6 is the cross-sectional view of FIG. 5 while the bracket receives the main body of the hanger component.
Figure 7:
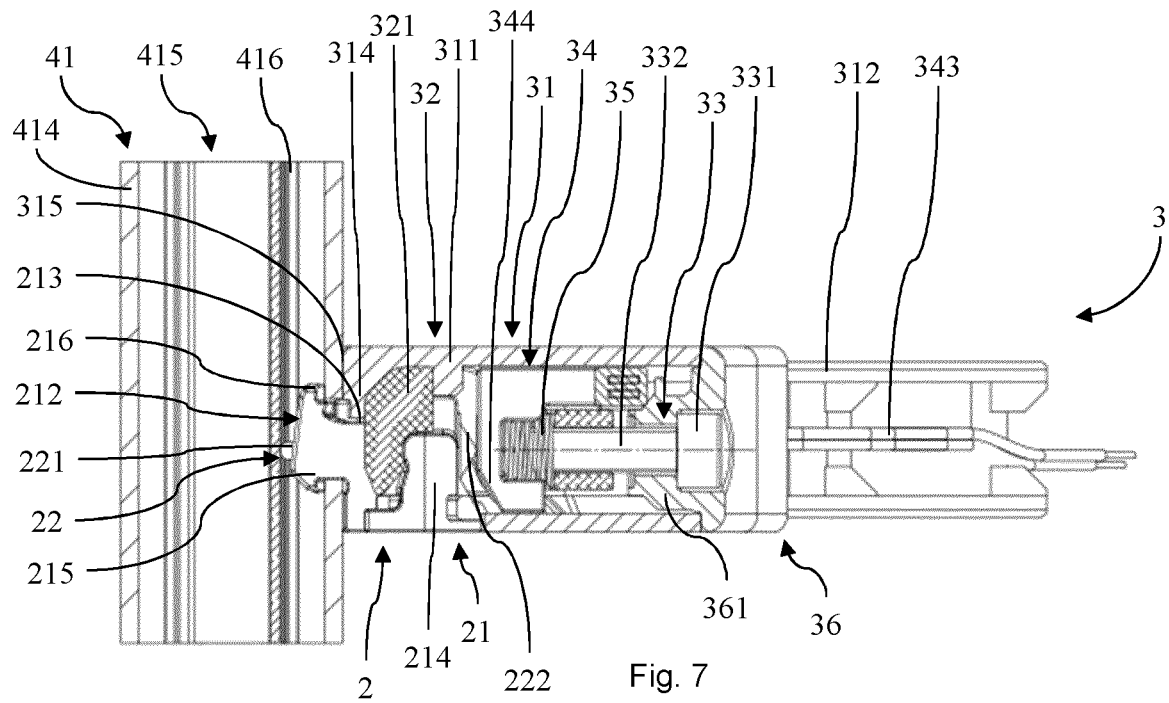
FIG. 7 is the cross-sectional view of FIG. 5, in which the bracket has received the main body of the hanger component.
Figure 8:
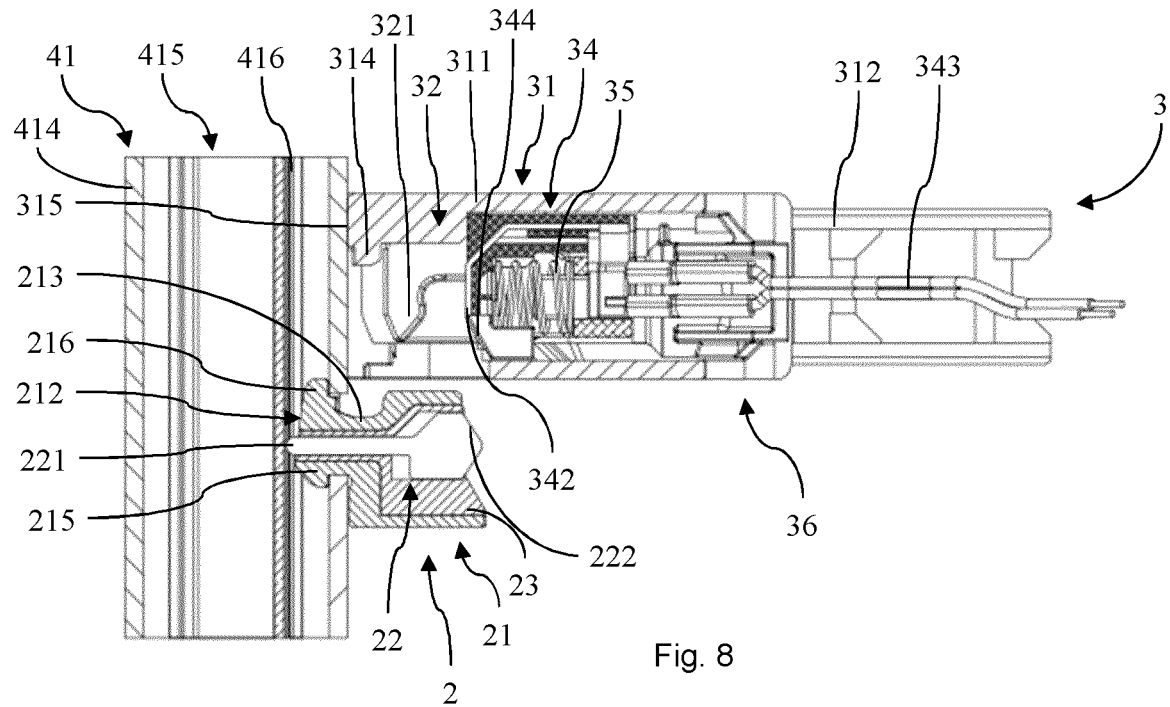
FIG. 8 is a cross-sectional view of the connection device from FIG. 1 when connecting the shelf frame of the structural system from FIG. 2 before the bracket receives the main body of the hanger component, wherein electrical aspects of the connection are illustrated in particular.
Figure 9:
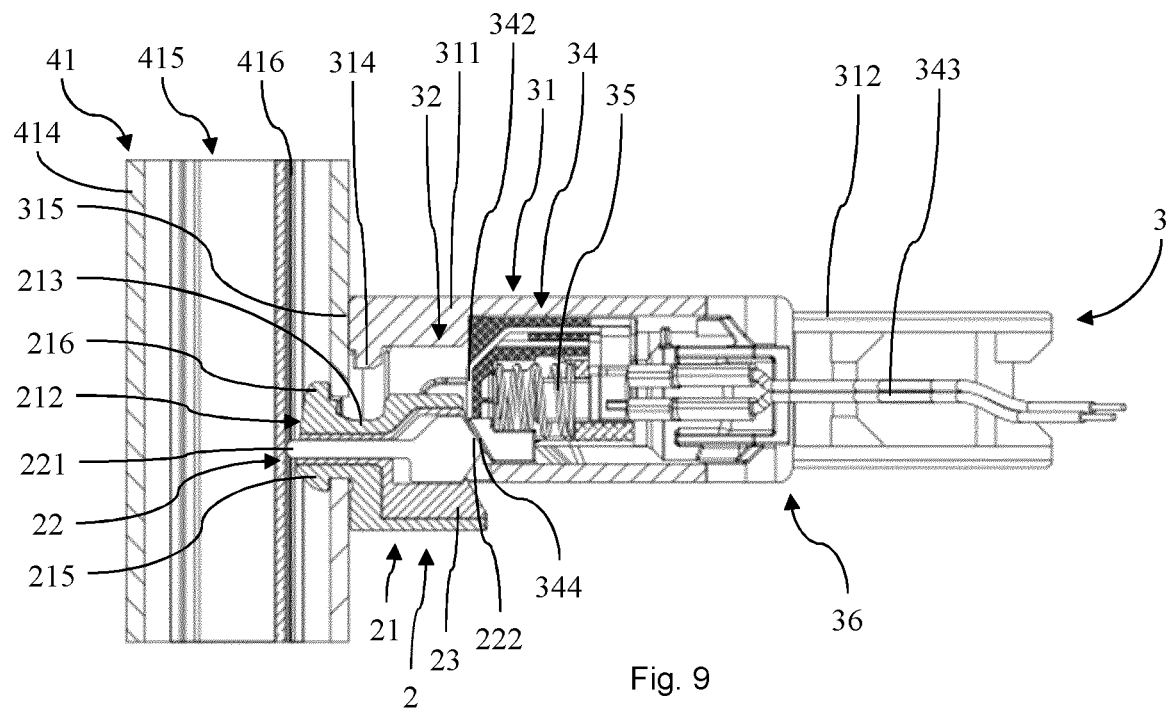
FIG. 9 is the cross-sectional view of FIG. 8 while the bracket receives the main body of the hanger component.
Figure 10:
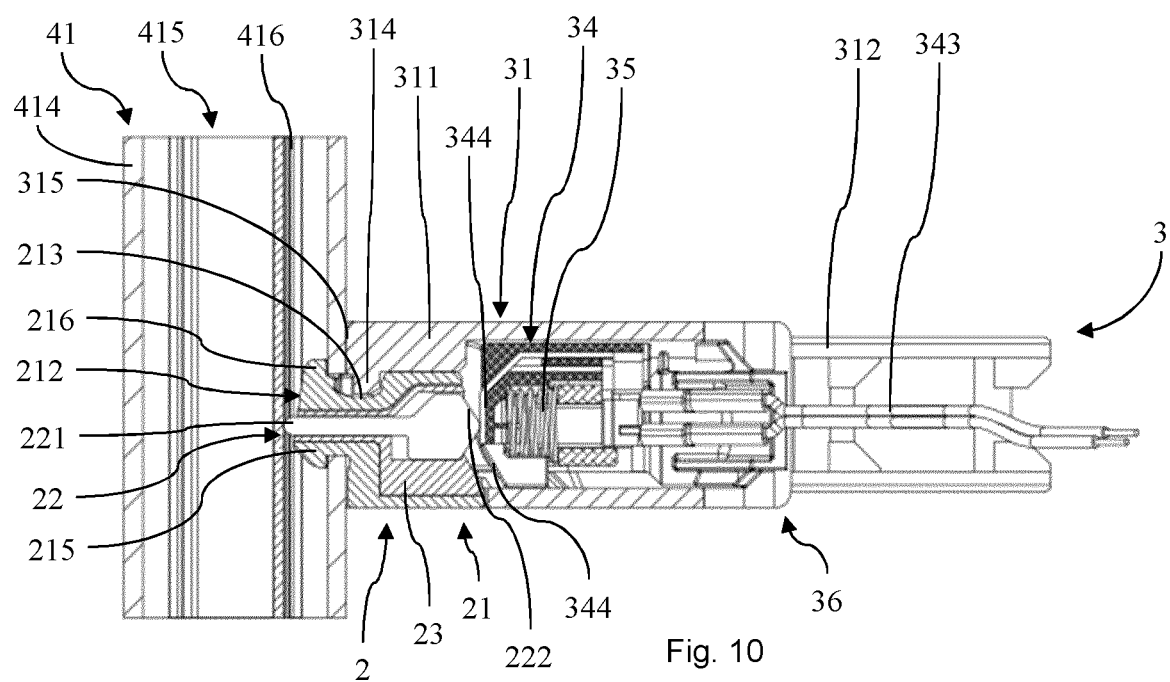
FIG. 10 is the cross-sectional view of FIG. 8, in which the bracket has received the main body of the hanger component.

FIGS. 5 to 7 below show the mounting of the bracket 3 on the hanger component 2 inserted in the aforementioned perforation of the perforations 411 of the vertical support and thus attached to the vertical support, in a view cut along a first sectional plane. FIGS. 8 to 10 show the same in a sectional view along a second sectional plane which is offset parallel to the first sectional plane.

In particular, FIG. 5 shows the bracket 3 before it is placed on the hanger component 2. It can be seen in the section along the first sectional plane of FIG. 5 that the claw part 32 surrounds the current tap 34 laterally. In particular, the front side of the body 341 of the current tap 34 lies between the two wing regions of the claw part 32. The front sides of the wing regions of the claw part 32 bear against a rear side of the projection 314 protruding into the cavity 313. The coil spring 35 is clamped between the intermediate region of the claw part 32 and the current tap 34 in such a way that the current tap 34 is pushed forward in the direction of the front face 315. The current tap 34 is held by a second projection lying parallel to the projection 314 or is pushed against it.

The actuating screw 3 is screwed into the bore of the intermediate region of the claw part 32 in such a way that its shank 332 protrudes through the bore and is situated between the two wing regions of the claw part 32. The shank 332 is thus within the coil spring 35.

The front face 315 of the housing 31 lies flush against an outside of the wall 414 of the vertical support 41. In doing so, it partially surrounds the vertical support 41. The vertical support 41 comprises a current profile 415 arranged in its interior. The current profile 415 has a carrier made of aluminum as well as an insulation base and two straight conductor tracks 416 running parallel to one another.

The first claws 321 of the claw part 32 are oriented downward and are located above the upward-oriented second claws 214 of the main body 21 of the hanger component 2. As can be seen in FIG. 6, in order to place the bracket 3 on the hanger component 2, the bracket 3 is moved vertically downward along the vertical support 41. The first claws 321 and the second claws 214 make contact when the bracket 3 is placed on the hanger component 2. With a further downward movement, the two claws 214, 321 engage in one another, so that at the end they are adjacent to one another. At the same time, the projection 314 of the housing 31 of the bracket 3 is pushed into the groove 213 of the hanger component 2, so that, at the end, a horizontal movement of the bracket 3 away from the vertical support 41 is blocked.

FIG. 7 shows that by tightening the actuating screw 33 after the bracket 3 has been placed on the hanger component 2, the claw part 32 is pulled away from the vertical support 41 horizontally to the right. The first claw 321 is pushed against the second claw 214, wherein the second claw 214 blocks a horizontal movement of the claw part 32 to the right. Because the head 331 of the actuating screw 33 sits in the screw head seat 361 of the cover 36 and rests against the cover 36, the cover 36 and, via the cover 36, also the housing 31 are pulled in the direction of the vertical support 41 when the actuating screw 33 is tightened. The front face 315 is pushed against the vertical support 41, so that the bracket 3 is firmly clamped together with the vertical support 41.

FIG. 8 shows the bracket 3 again in the same position as in FIG. 5 before it is placed on the hanger component 2 which is mounted on the vertical support 41. It can be seen in the section along the second sectional plane of FIG. 8 that the coil spring 35 pushes the current tap 34 forward, i.e. horizontally in the direction of the front face 315 to the left. The front side of the body 341 of the current tap 34 is equipped with the two contacts 342 which extend through the body 341 from the front side and are connected to the connection cables 343.

The contact pins 22 of the hanger component 2 each comprise a base from which a rod extends horizontally in the direction of the busbar 415 of the vertical tube 41. The left end of the rod forms one of the contact tips 221. The contact pins 22 are arranged in an interior of the main body 21 of the hanger component 2 such that the rod protrudes through a front opening formed in a front side of the main body 21 and the base is accessible through a rear opening formed in a rear side of the main body 21. In particular, the inclined rear side 222 formed on the base is exposed through the rear opening. The hanger component 2 further comprises an insulation layer 23 which electrically insulates the contact pin 22 from the main body 21.

FIG. 9 shows the bracket 3 in the same position as in FIG. 6 while it is being placed on the hanger component 2 mounted on the vertical support 41. It can be seen in the section along the second sectional plane of FIG. 9 that the inclined front underside 342 of the current tap 34 rests against the inclined rear sides 222 of the contact pins 22. A further downward movement of the bracket 3 pushes the current tap 34 and the contact pins 22 apart horizontally. As a result, on the one hand, the contact pins 22 are moved to the left in the direction of the busbar 415, so that the contact tips 221 are increasingly pushed against the conductor tracks 416. On the other hand, the current tap 34 is moved horizontally to the right, so that the coil spring 35 is increasingly compressed and tensioned.

FIG. 10 shows the bracket 3 in the same position as in FIG. 7, in which it is placed on the hanger component 2 mounted on the vertical support 41. It can be seen in the section along the second sectional plane of FIG. 10 that the contacts 344 of the current tap 34 are pushed against the contact pins 22 by the tensioned coil spring 35. As a result, the contact tips 221 of the contact pins 22 are pushed against the conductor tracks 416. In this way, a secure and stable continuous electrical connection or contact is created from the conductor tracks 416 inside the vertical support 41 to the connection cables 343 of the bracket 34.

Figure 11:
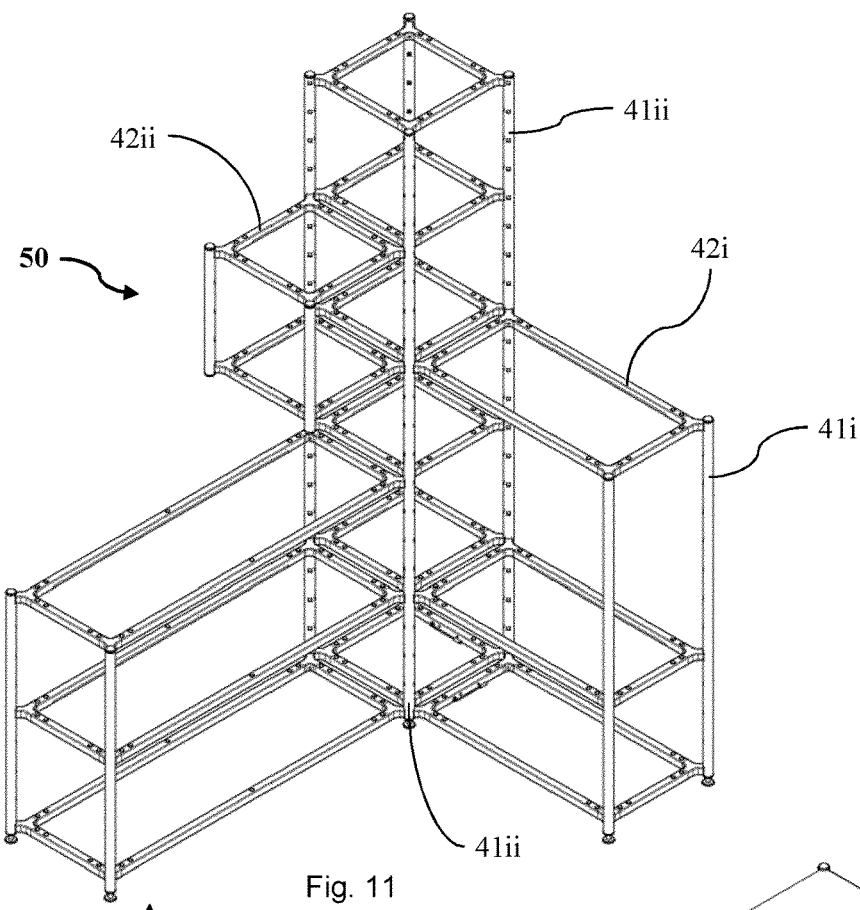
FIG. 11 is a perspective view of a second embodiment of a shelving unit according to the invention without shelves that is constructed from the structural system of FIG. 2.
Figure 12:
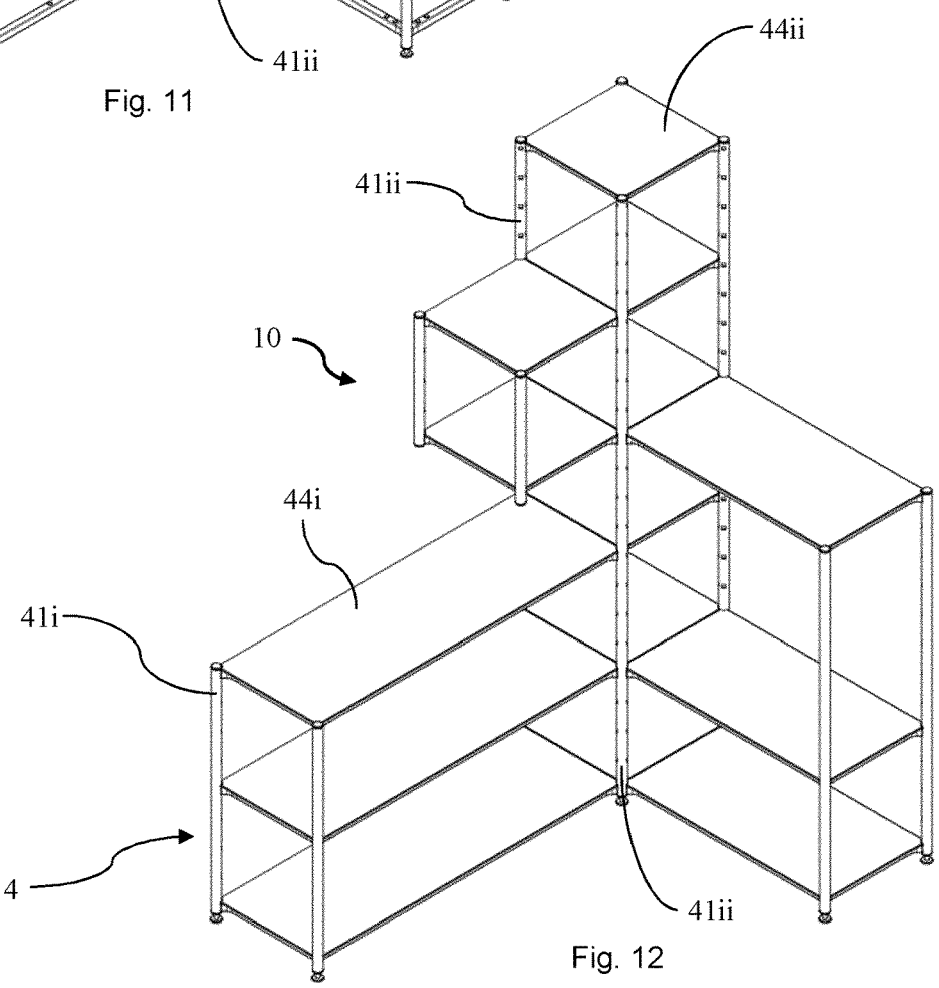
FIG. 12 is a perspective view of the shelving unit of FIG. 7 with associated shelves.

FIG. 11 shows a second embodiment of a shelving unit 50 according to the invention constructed from the structural system 4. In particular, it is constructed from seven vertical supports 41*i* with one row of perforations, two vertical supports 41*ii* with two rows of perforations, one vertical support 4 liii with three rows of perforations, six large shelf frames 42*i*, eight small shelf frames 42*ii* and fifty-eight hanger components 2. The vertical supports 41*i* comprise two vertical supports 41*i* of one shelving unit height in length, two vertical supports 41*i* of two shelving unit heights in length, two vertical supports 41*i* of three shelving unit heights in length, and one vertical support 41*i* of five shelving unit heights in length. The vertical supports 41*ii* and the vertical supports 4 liii each have a length of five shelving unit heights. The shelving unit height can, for example, correspond approximately to the height of an erectly positioned folder.

The shelf frames 42*i*, 42*ii* are each connected to four vertical supports 41*i*, 41*ii*, 41*iii* via four of the hanger components 2 at their brackets 3 used as mounting corners. The hanger components 2 are suspended from the appropriate perforations at the desired heights, and the shelf frames 42*i*, 42*ii* are placed on the associated four hanger components 2 as described in detail above. At least some of the hanger components 2 are designed to tap current inside the associated vertical support 41*i*, 41*ii*, 41*iii* and to conduct it to the associated shelf frame 42*i*, 42*ii*.

FIG. 8 shows the shelving unit 50 in the final configuration. In particular, it also comprises, as shelves, six large glass shelves 44*i* and eight small glass shelves 44*ii*. The glass shelves 44*i*, 44*ii* are dimensioned according to the shelf frames 42*i*, 42*ii* and placed thereon or connected thereto.

Although the invention is illustrated and described in detail by means of the drawings and the associated description, this illustration and this detailed description are to be understood as illustrative and exemplary and not as limiting the invention. In order not to transfigure the invention, in certain cases well-known structures and techniques cannot be shown and described in detail. It is understood that persons skilled in the art can make changes and modifications without departing from the scope of the following claims. In particular, the present invention covers further embodiments with any combination of features that may differ from the combinations of features explicitly described.

The present disclosure also comprises embodiments with any combination of features mentioned or shown above or below for various embodiments. It also comprises individual features in the drawings, even if they are shown there in connection with other features and/or are not mentioned above or below. The alternatives of embodiments and individual alternatives of the features thereof that are described in the drawings and the description can be excluded from the subject matter of the invention or from the disclosed subject matter. The disclosure comprises embodiments that only comprise the features described in the claims or in the embodiments and also those that comprise additional different features.

Furthermore, the term "comprise" and derivatives thereof do not exclude other elements or steps. Likewise, the indefinite article "a" or "an" and derivatives thereof do not exclude a plurality. The functions of a plurality of features listed in the claims can be performed by a unit or a step. The mere fact that certain measures are listed in different dependent claims does not mean that a combination of those measures cannot be used advantageously. The terms "essentially," "about," "approximately" and the like in connection with a property or a value also define in particular exactly the property or exactly the value. The terms "about" and "approximately" in connection with a given numerical value or range can refer to a value or range which lies within 20%, within 10%, within 5% or within 2% of the given value or range.

| List of reference signs | | | |
|---|---|---|---|
| 1 | Connection device | 331 | Head |
| 2 | Hanger component | 332 | Shank |
| 21 | Main body | 34 | Current tap |
| 211 | Support portion | 341 | Body |
| 212 | Engagement portion | 342 | Contact |
| 213 | Groove (second coupling structure) | 343 | Connection cable |
| | | 344 | Inclined front underside (second inclined face) |
| 214 | Second claw | | |
| 215 | Hook region | | |
| 216 | Tongue region | 35 | Coil spring (spring element) |
| 22 | Contact pin (contact element) | | |
| | | 36 | Cover |
| 221 | Contact tip | 361 | Screw head seat |
| 222 | Inclined rear side (first inclined face) | 4 | Structural system |
| | | 41 | Vertical support |
| 23 | Insulation layer | 411 | Perforation |
| 3 | Bracket | 412 | Base |
| 31 | Housing (housing portion) | 413 | Longitudinal axis |
| 311 | Projection | 414 | Wall |
| 312 | Mating portion | 415 | Busbar |
| 313 | Cavity | 416 | Conductor track |
| 314 | Projection (first coupling structure) | 42 | Shelf frame |
| | | 421 | Transverse strut |
| 315 | Front face | 422 | Longitudinal strut |
| 32 | Claw part | 43 | Screwdriver |
| 321 | First claw | 44 | Shelf |
| 33 | Actuating screw (actuating element) | 5 | Shelving unit |

What is claimed is:

1. A connection device for installing a shelf or a shelf frame on a vertical support equipped with at least one axially extending row of perforations in order to construct a shelving unit, comprising:
a hanger component with a main body having an engagement portion and a support portion and being designed to be suspended from one of the perforations of the vertical support such that the engagement portion engages behind one of the perforations of the vertical support and the support portion is arranged outside of the aforementioned perforation of the perforations of the vertical support; and
a bracket comprising a housing portion which has a front face designed to rest against the vertical support and a cavity that is shaped so as to receive the support portion of the main body of the hanger component,
wherein the bracket is equipped with a clamping mechanism which is designed to clamp the housing portion of the bracket together with the vertical support when the cavity of the housing portion of the bracket receives the support portion of the main body of the hanger component and the main body of the hanger component is suspended from the aforementioned perforation of the perforations of the vertical support,
wherein the clamping mechanism of the bracket comprises a claw part having a first claw,
the support portion of the main body of the hanger component is equipped with a second claw, and
the first claw of the claw part of the clamping mechanism of the bracket and the second claw of the support portion of the main body of the hanger component engage one another when the cavity of the housing portion of the bracket receives the support portion of the main body of the hanger component and the main body of the hanger component is suspended from the aforementioned perforation of the perforations of the vertical support.

2. The connection device according to claim 1, wherein the cavity of the housing portion of the bracket is equipped with a first coupling structure,
the support portion of the main body of the hanger component is equipped with a second coupling structure, and
the first coupling structure and the second coupling structure engage in one another when the cavity of the housing portion of the bracket receives the support portion of the main body of the hanger component and the main body of the hanger component is suspended from the aforementioned perforation of the perforations of the vertical support.

3. The connection device according to claim 2, wherein the first coupling structure of the cavity of the housing portion of the bracket is designed as a projection and the second coupling structure of the support portion of the main body of the hanger component is designed as a groove.

4. The connection device according to claim 1, wherein the claw part of the clamping mechanism of the bracket is arranged in the housing portion of the bracket and is movable relative to the housing portion of the bracket.

5. The connection device according to claim 4, wherein the clamping mechanism of the bracket has an actuating element which is designed to move the claw part when it is actuated in such a way that the first claw of the claw part of the clamping mechanism of the bracket and the second claw of the support portion of the main body of the hanger component are pushed against one another.

6. The connection device according to claim 5, wherein the actuating element of the clamping mechanism of the bracket is equipped with a thread and the claw part of the clamping mechanism of the bracket is equipped with a mating thread corresponding to the thread, such that twisting the thread relative to the mating thread moves the claw part relative to the housing portion of the bracket.

7. The connection device according to claim 5, wherein the actuating element of the clamping mechanism of the bracket is connected in a stationary manner to the housing portion of the bracket in a clamping movement direction.

8. The connection device according to claim 5, wherein the bracket comprises a cover which holds the claw part in the housing portion of the bracket.

9. The connection device according to claim 8, wherein the actuating element of the clamping mechanism of the bracket is mounted on the cover of the bracket.

10. The connection device according to claim 1, wherein
the main body of the hanger component has a front side and a rear side,
the front side of the main body of the hanger component is inside the vertical support when the main body of the hanger component is suspended from the aforementioned perforation of the perforations of the vertical support,
the rear side of the main body of the hanger component faces away from the vertical support when the main body of the hanger component is suspended from the aforementioned perforation of the perforations of the vertical support, and
the hanger component is designed to conduct current from the front side of the main body to the rear side of the main body.

11. The connection device according to claim 10, wherein
the hanger component comprises a contact element made of an electrically conductive material,
the main body has an interior which is open to the front side via a front opening and to the rear side via a rear opening, and
the contact element is arranged in the interior of the main body, so that the contact element protrudes through the front opening and is accessible through the rear opening.

12. The connection device according to claim 11, wherein the contact element of the hanger component is arranged in the interior of the main body of the hanger component in such a way that it can be moved in a contacting movement direction relative to the main body of the hanger component.

13. The connection device according to claim 10, wherein the bracket has a current tap which is arranged in the housing portion of the bracket and is movable relative to the housing portion of the bracket.

14. The connection device according to claim 13, wherein the bracket has a spring element which pushes the current tap of the bracket against the hanger component when the cavity of the housing portion of the bracket receives the support portion of the main body of the hanger component.

15. The connection device according to claim 11, wherein the bracket has a current tap which is arranged in the housing portion of the bracket and is movable relative to the housing portion of the bracket,
wherein the bracket has a spring element which pushes the current tap of the bracket against the hanger component when the cavity of the housing portion of the bracket receives the support portion of the main body of the hanger component, and
wherein the spring element of the bracket pushes the current tap of the bracket through the rear opening of the main body against the contact element of the hanger component.

16. The connection device according to claim 15, wherein the contact element of the hanger component has a first inclined face and the current tap of the bracket has a second inclined face formed counter to the first inclined face, the two being arranged such that they rest against one another when the cavity of the housing portion of the bracket receives the support portion of the main body of the hanger component.

17. The connection device according to claim 1, wherein the housing portion of the bracket is equipped with two mating portions for attaching a strut in each case, wherein the mating portions run at quasi-right angles to one another.

18. The connection device according to claim 17, wherein the housing portion of the bracket comprises a projection which has the cavity and the front face and which extends approximately along a bisector of an external angle of the two mating portions.

19. The connection device according to claim 1, wherein the engagement portion of the hanger component has a hook region which is designed to be suspended from the aforementioned perforation of the perforations of the vertical support.

20. The connection device according to claim 19, wherein the engagement portion of the hanger component has a tongue region which extends counter to the hook region and which is designed to rest against a wall of the vertical support when the main body of the hanger component is suspended from the aforementioned perforation of the perforations of the vertical support.

21. A structural system for modular construction of shelving units having at least one vertical support equipped with the at least one axially extending row of perforations, and at least one connection device according to claim 1.

22. The structural system according to claim 21, wherein
the at least one vertical support has a hollow tubular body and a current profile equipped with at least one conductor track,
the tubular body is equipped with the at least one row of perforations, and
the current profile is arranged within the tubular body, such that the at least one conductor track extends along the tubular body.

23. The structural system according to claim 22, which comprises at least three further vertical supports, each having at least one axially extending row of perforations, at least seven further connection devices and at least eight struts, wherein in each case four struts with four brackets of the at least one connection device form the shelf frame by two struts being connected to one another via one of the brackets.

24. The shelving unit constructed from the structural system according to claim 23.

* * * * *